Figure 2:
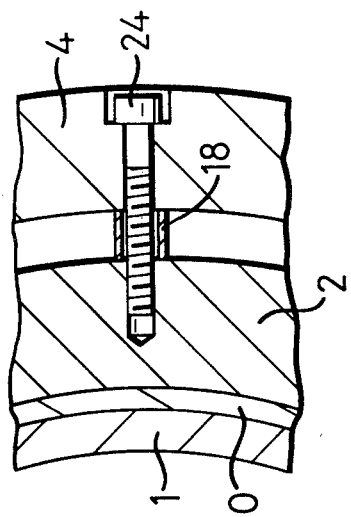

United States Patent [19]

Martin

[11] 4,361,459
[45] Nov. 30, 1982

[54] RESIN IMPREGNATOR FOR FILAMENT WOUND PIPE

[75] Inventor: Simon C. Martin, Bristol, England

[73] Assignee: Bristol Composite Materials Engineering Limited, Bristol, England

[21] Appl. No.: 256,392

[22] Filed: Apr. 22, 1981

[51] Int. Cl.³ .................................................. B65H 81/00
[52] U.S. Cl. .................................. 156/425; 118/323; 156/429
[58] Field of Search ............... 156/172, 148, 173, 175, 156/169, 425, 428, 429, 430, 433, 441, 448, 431, 570; 118/307, 300, DIG. 16, 323, 325; 427/240, 241

[56] References Cited

U.S. PATENT DOCUMENTS 3,378,427 4/1968 McClean ............................ 156/431
3,459,586 8/1969 Kiwet et al. ........................ 118/300

FOREIGN PATENT DOCUMENTS 7319224 of 0000 Japan .

Primary Examiner—Michael W. Ball
Attorney, Agent, or Firm—Morgan, Finnegan, Pine, Foley & Lee

[57] ABSTRACT

Apparatus for impregnating filaments with resin, suitable for use on fibre-reinforced pipe making machines, comprises:
(i) a fixed annular guide (6) feeding the filaments onto a translating, or translating and rotating mandrel (D),
(ii) an annular spinning disc (4) with means for rotating the disc (12), and
(iii) means for feeding resing to the disc (4).

The spinning disc feeds resin to the filaments in controlled amounts and avoids the use of porous guides or resin troughs.

5 Claims, 3 Drawing Figures

RESIN IMPREGNATOR FOR FILAMENT WOUND PIPE

This invention relates to apparatus for applying resin to filaments to be used for forming filament-reinforced resin pipes, tubes or other cylindrical bodies.

In the manufacture of filament-reinforced resin pipes by the sheath process, flat rovings of filaments are wound tangentially onto a rotating and translating mandrel. A variety of filaments and resins may be used but the filaments are usually glass or carbon filaments and the resins polyesters or epoxides.

Prior to winding the filaments are impregnated with resin and for efficient operation each filament should receive the same controlled amount of resin.

One known method of impregnation is to pass the filaments through an annular guide ring of porous material, which acts in effect as a wick to transfer resin to the filaments. The disadvantages of this method are:
(a) unequal impregnation due to gravity effects,
(b) possible damage to the filaments by rubbing contact with the porous guide, and
(c) the need to replace the porous material after each run since it becomes clogged with hardened resin.

An alternative method is to feed the filaments through resin baths disposed on either side of the machine and then to guide the filaments onto the mandrel. This system also has disadvantages viz:
(a) a number of baths are required depending on the number of rovings and their radial disposition,
(b) wet filaments have to pass round guides to guide them into their radial path,
(c) threading up before a run and cleaning after it presents considerable problems, and
(d) the tension varies from filament to filament due to unequal path lengths.

Filament-reinforced pipes may also be manufactured on mandrels which translate but do not rotate in which case the filaments run parallel to the axis of the pipe and are cemented to form a pipe. Carbon-fibre reinforced pipes may be made in this way, the resin cement being an epoxide. Similar problems of coating the filament with a controlled and uniform amount of resin arise with such axially aligned filament-reinforced pipes as they do with tangentially wound pipes.

The present invention aims to overcome the disadvantages of known systems by spraying resin onto the filaments using a spinning disc.

According to the present invention apparatus for impregnating filaments with resin comprises:
(i) a fixed annular guide adapted to feed filaments onto a translating mandrel, said guide being co-axial with the mandrel,
(ii) an annular spinning disc also co-axial with the mandrel and positioned so that the periphery of the disc is adjacent to the guide,
(iii) means for rotating the disc, and
(iv) means capable of feeding resin to the disc in a controllable amount.

The axis of the guide, disc and mandrel may be in any direction, but in current machines the mandrel axis is usually horizontal, and this is preferred with the present invention. Existing machines may readily be adapted by replacing existing impregnation equipment with the present apparatus.

The mandrel may both translate and rotate for tangentially wound pipes or may translate without rotation for axially aligned pipes. The fixed annular guide may be shaped and positioned to give a smooth feed of filaments from their storage reels onto the mandrel without abrupt changes of direction. Thus it may be a truncated cone which may be of relatively large diameter with respect to the mandrel and shallow in depth. As discussed hereafter, the spinning disc may be positioned on a fixed sleeve surrounding the mandrel and part of this fixed sleeve may also act as part of the guide.

The spinning disc may be positioned on a fixed sleeve and surrounding the mandrel and separated from it by a gap or by suitable bearings. The form of the disc is not critical and may vary from a flat annular disc through hollow cones of varying included angles to an annular cylinder. In the case of conical discs, resin may be fed to the smaller end of a truncated cone where there may be a reservoir. Centrifugal force carries the resin along the inside of the cone to the periphery from where it is thrown off as a corona onto the filaments passing into the annular guide.

With a flat annular disc the reservoir may be smaller or non-existent but again centrifugal force will carry the resin along the surface of the disc to the periphery of the disc.

It has been found that the form in which the resin is discharged from the periphery of the disc is not critical (i.e. the resin may be discharged as a sheet or as droplets) and it is not necessary for the periphery of the disc to be serrated as with atomising discs. Further, the speed of rotation is not critical and, in general, resin is discharged at the rate at which it is fed. This means that the amount of resin applied to the filaments can be simply controlled by the rate of supply of resin to the disc. There is no need for a large reservoir of liquid to be on the disc at any time so supply to and cut-off of resin from the filaments can be almost instantaneous.

In general filament-reinforced pipes may have from 40–60% of their volume as filaments and the resin feed rate can be simply calculated once the feed rate of the filaments is known.

The spinning disc surrounds the mandrel with the filaments outside the disc so in practice the filaments will be in the form of a cone of filaments or rovings of filaments moving tangentially onto the mandrel at a point some distance along the axis of the mandrel from the spinning disc. This facilitates start-up and shut-down of the machine and allows time for the resin to impregnate the rovings thoroughly before being formed into a pipe on the mandrel.

The disc can be driven in any convenient manner, e.g. by an electric motor through gearing and the resin can also be delivered to the disc in any convenient manner, e.g. by an electrically driven pump.

The whole assembly may be mounted on suitable supporting brackets.

Figure 1:
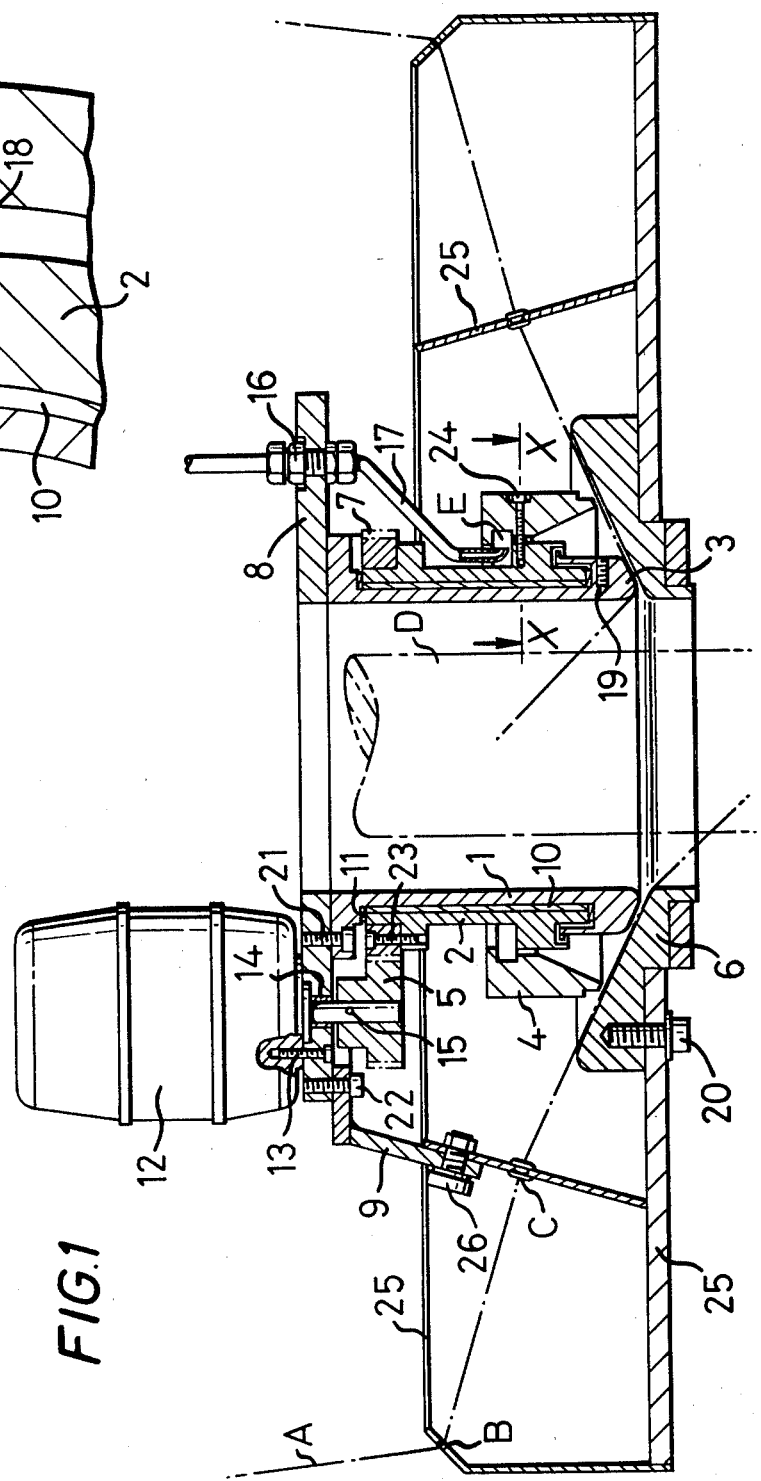
Figure 3:
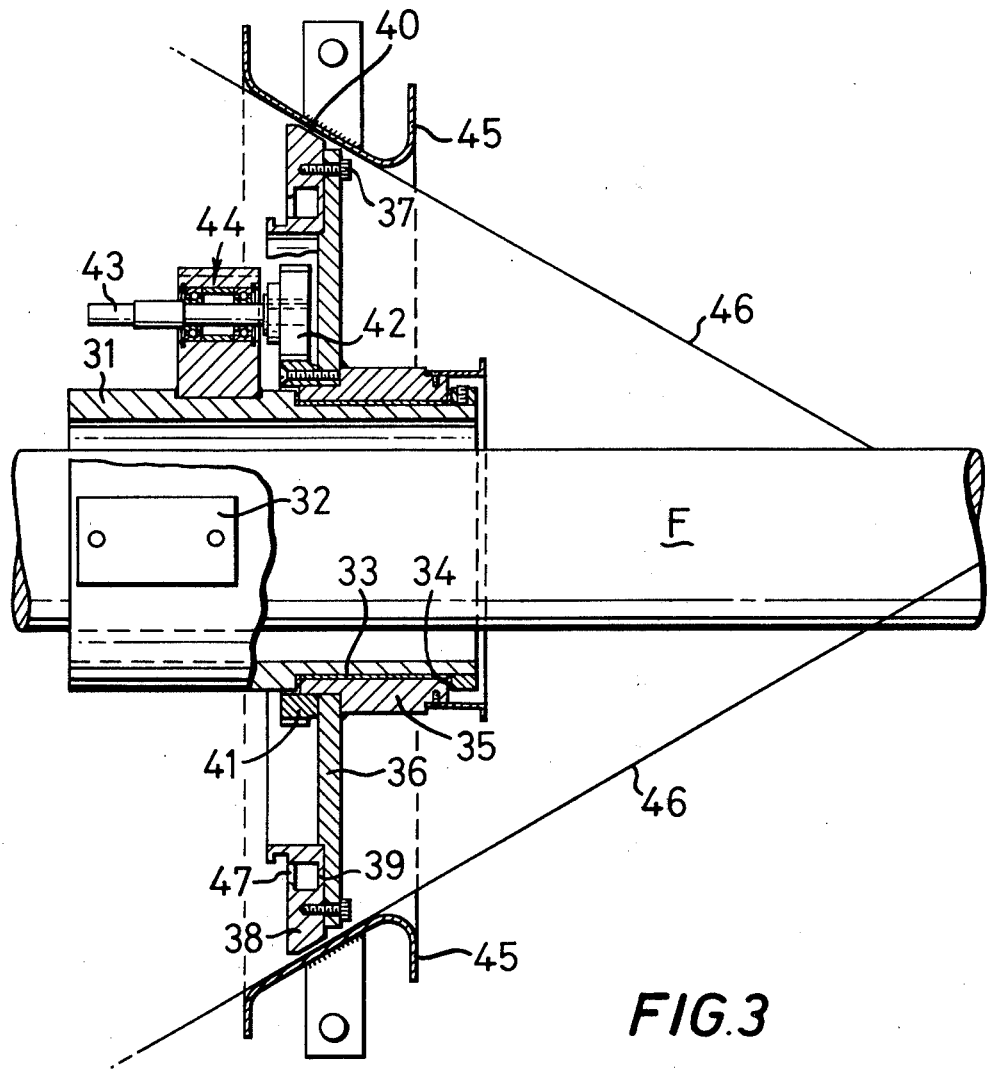

The invention is illustrated with reference to the accompanying drawings in which:

FIG. 1 is a section through an apparatus according to the invention used for making tangentially-wound filament-reinforced pipes, FIG. 2 is a part section along the line X—X of FIG. 1, and FIG. 3 is a section through an apparatus according to the invention for making axially aligned filament-reinforced pipes.

In FIGS. 1 and 2 a filament-reinforced resin pipe manufacturing machine has a rotating and translating mandrel D which, although shown vertically, has in fact a horizontal axis of rotation. Surrounding the mandrel D is a fixed support ring 8 and bracket 9 bolted to ring 8 by bolts, one of which is shown at 22. The bracket 9 in its turn is bolted onto the machine framework 25 by three bolts positioned at 120° around the machine. One bolt is shown at 26.

Support ring 8 has a sleeve 1 bolted to it by bolts, one of which is shown at 21. Sleeve one terminates in a filament guide ring 3 attached to the sleeve by screws, one of which is shown at 19.

Surrounding sleeve 1 is a rotable annular shaft 2, separated from sleeve 1 by bearings 10 and 11. Mounted on shaft 2 by screws, one of which is shown at 24, is a spinning disc 4 in the form of a hollow, inverted, truncated cone. The disc 4 has an annular reservoir E which may be supplied with resin by pipe 17, held onto support ring 8 by nuts 16. The screws 24 (of which there are eight) holding disc 4 onto shaft 2 pass through spacing pieces 18 (see FIG. 2). Thus, except at these eight screw points, reservoir E is in communication with the inside of the cone of the disc.

Shaft 2 has a gear ring 7 bolted onto it by bolts, one of which is shown at 23. Gear ring 7 meshes with pinion 5 fixed by screw 15 to the drive shaft of an electric motor 12, held onto support ring 8 by bolts, one of which is shown at 13. The drive shaft rotates in a bearing 14 in support ring 8.

The machine framework 25 has outer and inner eyelet rings B and C and the framework also has bolted to it filament guide ring 6, one bolt being shown at 20.

In operation, rovings of filaments are fed from path A through eyelets B and C onto mandrel D, passing through the annulus between fixed filament guides 3 and 6. As they pass over filament guide 6 the rovings receive an annular spray of resin from disc 4, the resin being moved by centrifugal force from reservoir E along the inner conical surface of the disc. Control of the resin feed controls the supply of resin to the filaments.

At the end of a run the apparatus may be cleaned by removing the three bolts 26, thus exposing disc 4 and guides 3 and 6.

In FIG. 3, the arrangement of the parts is generally similar to FIG. 1 the main differences being that the mandrel translates but does not rotate and the disc is a flat annular disc rather than a truncated cone.

Translating, non-rotating mandrel F is surrounded by a fixed sleeve 31 held onto the machine frame by brackets 32. Surrounding one end of sleeve 31 and separated from it by bearings 33, 34 is a rotatable sleeve 35 to which is welded at right angles a flat disc 36. Bolted to disc 36 by bolts 37 is a ring 38 having a small reservoir 39 and a chamfered periphery 40. The sleeve 35, disc 36 and ring 38 together form the resin applying disc and they are rotated through gears 41 and 42. The drive to gear 42 is through shaft 43 from an electric motor (not shown). Shaft 43 is held in bearings 44 fixed to sleeve 31.

Adjacent to and surrounding the chamfered periphery 40 of ring 38 is an annular conical guide 45 fixed to a convenient part of the machine (not shown). Filaments 46 are fed from reels or other storage means (not shown) onto the mandrel F between guide 45 and the chamfered periphery 40.

In operation resin is injected from a nozzle (not shown) into reservoir 39 of the ring portion 38 of the spinning disc through the opening 47. As further resin is injected, resin already in the reservoir flows out of the opening 47 and is carried by centrifugal force along the surface of ring 38 to the periphery 40 and onto filaments 46 passing between the ring 38 and fixed guide 45.

At the end of a run the apparatus may be cleaned by moving fixed sleeve 31 to the left on runners (not shown) thus exposing ring 38 and guide 45.

In one specific example using the apparatus of FIG. 1, 120 glass filaments of 600 tex were fed tangentially onto a rotating and translating mandrel. The linear speed of the filaments as they passed the spinning disc was 40 cm/sec. The disc was rotating at 600 rpm and epoxide resin was fed to the disc at a rate of 9 ml/sec. The resulting pipe had a filament volume of 55%.

In another specific example using the apparatus of FIG. 3, 270 carbon filaments were fed axially onto a translating but non-rotating mandrel. The linear speed of the filaments passing the discs was 3 cm/sec, the rotational speed of the disc was rpm, and the resin feed rate to the disc was 4 ml/sec. The resulting pipe had a filament volume of 50%.

The apparatus thus has the following advantages over existing impregnation equipment:
(i) Even impregnation of resin over the full 360° of filaments around a mandrel.
(ii) Resin supply is controllable by simply altering the pumping rate. The response can be virtually instantaneous and resin supply can be metered down to zero flow.
(iii) The risk of filament damage is minimised. There are no porous guides and all guides can be smooth and polished.
(iv) Easy cleaning procedure at the end of a run.
(v) Resin and hardener can be mixed immediately prior to being fed onto the disc. The volume of mixed resin/hardener in the system may be small and cleaning and "pot life" problems are reduced.

I claim:
1. A filament-reinforced pipe manufacturing machine with means for impregnating filaments with resin comprising
   (i) a mandrel capable of translation;
   (ii) a fixed annular guide coaxial with the mandrel and axially positioned with respect to it so that the filaments are fed onto the mandrel as a converging cone of filaments;
   (iii) an annular spinning disc also coaxial with the mandrel and positioned so that the periphery of the disc is adjacent to the guide;
   (iv) means capable of feeding resin to the disc in a controllable amount, and
   (v) means for spinning the disc to eject resin centrifugally onto the filaments moving over said guide.
2. Apparatus as claimed in claim 1 wherein the mandrel is a translating and rotating mandrel.
3. Apparatus as claimed in claim 1 or 2 wherein the fixed annular guide is a truncated cone.
4. Apparatus as claimed in claim 1 or 2 wherein the disc is a flat annular disc.
5. Apparatus as claimed in claim 1 or 2 wherein the disc is a hollow truncated cone.